(12) United States Patent
Kim et al.

(10) Patent No.: US 8,939,441 B2
(45) Date of Patent: Jan. 27, 2015

(54) APPARATUS FOR CHARGING AND DISCHARGING

(75) Inventors: Min-Hyung Kim, Yongin-si (KR); Sang-Young Jin, Yongin-si (KR); Hee-Youl Yoon, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 925 days.

(21) Appl. No.: 13/109,207

(22) Filed: May 17, 2011

(65) Prior Publication Data

US 2012/0045677 A1    Feb. 23, 2012

(30) Foreign Application Priority Data

Aug. 19, 2010 (KR) ........................ 10-2010-0080294

(51) Int. Cl.
*B23Q 1/00* (2006.01)
*H02J 7/00* (2006.01)
*H01M 10/46* (2006.01)

(52) U.S. Cl.
CPC ............. *H02J 7/0042* (2013.01); *H01M 10/46* (2013.01)
USPC ................................ 269/67; 269/61; 269/211

(58) Field of Classification Search
USPC ............ 269/67, 43, 45, 55, 68, 225, 211, 212
See application file for complete search history.

(56) References Cited

U.S. PATENT DOCUMENTS

| | | | | | |
|---|---|---|---|---|---|
| 2,225,273 | A | * | 12/1940 | Jacobs | ............................. 269/60 |
| 2,535,450 | A | * | 12/1950 | O'Malley | ........................ 269/43 |
| 3,218,056 | A | * | 11/1965 | Kaplan et al. | .................... 269/61 |
| 3,700,228 | A | * | 10/1972 | Peale | ............................... 269/61 |
| 4,241,906 | A | * | 12/1980 | Cole | ................................. 269/43 |
| 4,341,375 | A | * | 7/1982 | Romanin | ........................ 269/43 |
| 4,355,793 | A | * | 10/1982 | Juneau | ............................ 269/93 |

(Continued)

FOREIGN PATENT DOCUMENTS

| | | |
|---|---|---|
| CN | 1436388 A | 8/2003 |
| JP | 1995-226234 | 8/1995 |

(Continued)

OTHER PUBLICATIONS

SIPO Office Action issued on Oct. 23, 2013 in connection with Chinese Patent Application Serial No. 201110240089.5 which also claims Korean Patent Application No. 2010-0080294 as its priority document.

(Continued)

*Primary Examiner* — Lee D Wilson
(74) *Attorney, Agent, or Firm* — Robert E. Bushnell, Esq.

(57) ABSTRACT

An apparatus for charging and discharging includes a support portion, first and second racks, first and second vertical partition walls and a pinion. The support portion supports a secondary battery. The first and second racks are moved in a horizontal direction. The plurality of first vertical partition walls are fixed to the first rack at a constant interval. The plurality of second vertical partition walls are provided between the respective first vertical partition walls and fixed to the second rack at a constant interval. The pinion moves the first and second racks in the opposite directions. Accordingly, a charging and discharging operation, a high-temperature aging operation, and the like are performed in a formation process while limiting the expansion of a battery can through a simple operation regardless of differences for each manufacturer and for each model, thereby saving time and, cost.

20 Claims, 4 Drawing Sheets

(56) References Cited

U.S. PATENT DOCUMENTS

| | | | |
|---|---|---|---|
| 6,105,948 A * | 8/2000 | Young | 269/43 |
| 6,289,583 B1 | 9/2001 | Belmont et al. | |
| 8,235,438 B2 * | 8/2012 | Saadat | 294/202 |
| 2006/0200972 A1 | 9/2006 | Onishi et al. | |
| 2006/0246345 A1 | 11/2006 | Yoon et al. | |
| 2012/0045677 A1 * | 2/2012 | Kim et al. | 429/100 |

FOREIGN PATENT DOCUMENTS

| | | |
|---|---|---|
| JP | 10-136572 A | 5/1998 |
| JP | 2001-291526 | 10/2001 |
| JP | 2009252602 A | 10/2009 |
| KR | 200152694 Y1 | 4/1999 |
| KR | 2001-0106065 A | 11/2001 |
| KR | 1020050013852 A | 2/2005 |
| KR | 20-0431514 Y1 | 11/2006 |
| WO | 01/89057 A1 | 11/2001 |

OTHER PUBLICATIONS

Korean Office action issued by KIPO on Dec. 20, 2011, corresponding to KR 10-2010-0080294 and Request for Entry attached herewith.

* cited by examiner

APPARATUS FOR CHARGING AND DISCHARGING

CLAIM OF PRIORITY

This application makes reference to, incorporates the same herein, and claims all benefits accruing under 35 U.S.C. §119 from an application earlier filed in the Korean Intellectual Property Office on 19 Aug. 2010 and there duly assigned Serial No. 10-2010-0080294.

BACKGROUND OF THE INVENTION

1. Field of the Invention

An aspect of the present invention relates to an apparatus for charging and discharging, and more particularly, to an apparatus capable of performing initial charge and discharge of a battery while limiting the expansion of the battery regardless of the size of a battery such as a secondary battery.

2. Description of the Related Art

In general, when an initial charge is performed for a closed secondary battery, a can of the secondary battery may expand. Therefore, an initial charge is necessarily performed for the closed battery in a non-charged state in order to limit the expansion of the battery. A waiting time period is required after the initial charging and discharging process is finished and before a following process starts, because the following process should start after the can of the battery becomes stabilized. When an expansion limiting member is used to limit the expansion of the battery, the expansion limiting member is required to be removed from the battery and the charged battery is required to be separated from an apparatus which charges the battery.

Therefore, operations before and after the charge and discharge of the battery are complicated, and the performing time for these operations is long. Hence, the productivity of the secondary battery is reduced. These disadvantages occur during a charging and discharge process and a high-temperature aging process as well as during an initial charging process.

In the case where a contemporary expansion limiting member is used to limit the expansion of the battery, when the can of the battery changes its thickness due to the charge and discharge of the battery, the battery cannot be easily inserted into an apparatus for charging the battery. Therefore, the entire apparatus for charging the battery is required to be replaced. In the field of medium-sized and large-sized battery modules used for electric automobiles or hybrid electric automobiles, on which many studies have been recently conducted, the sizes of batteries may vary for different manufacturers and for different models; therefore, a simplified standard operation and apparatus for limiting the expansion of the can of the battery and charging/discharging the battery is required.

The above information disclosed in this Background section is only for enhancement of understanding of the background of the invention and therefore it may contain information that does not form the prior art that is already known in this country to a person of ordinary skill in the art.

SUMMARY OF THE INVENTION

One embodiment of the present invention provides an apparatus for charging and discharging a battery and such apparatus may limit the expansion of a battery corresponding to various kinds of secondary batteries.

In accordance with an aspect of the present invention, an apparatus for charging and discharging may include a support portion, first and second racks, first and second vertical partition walls and a pinion.

The support portion may support a secondary battery. The first and second racks may be moved in a horizontal direction. The plurality of first vertical partition walls may be fixed to the first rack at a constant interval. The plurality of second vertical partition walls may be provided between the respective first vertical partition walls and fixed to the second rack at a constant interval. The pinion may move the first and second racks in the opposite directions.

The apparatus may further include a driving portion that drives the pinion.

The apparatus may further include a first fixing mechanism that fixes or locks the pinion. The first fixing mechanism may be a brake type fixing or locking mechanism using any one of air pressure and oil pressure.

The apparatus may further include an aligning portion that moves any one of the first and second vertical partition walls respectively positioned at outermost sides in the horizontal direction. The aligning portion may be a ball-screw type aligning portion.

The apparatus may further include a second fixing mechanism that limits the movement of at least one of the first and second vertical partition walls respectively positioned at the outermost sides in the horizontal direction. The second fixing mechanism may be a ball-screw type fixing mechanism. The second fixing mechanism may be provided with a first elastic member that supports the first and second vertical partition walls respectively positioned at the outermost sides with an elastic force.

The first and second vertical partition walls may be formed of a metallic material. The first and second vertical partition walls may be formed of an alloy including at least one of aluminum, iron, tungsten and copper.

Heat dissipation paths may be formed in the horizontal direction in the first and second partition walls.

Each of the first and second vertical partition walls may include a support wall, a contact wall and a second elastic member. The support wall may be fixed and attached to the first and second racks. The contact wall may be in contact with the secondary battery. The second elastic member may be interposed between the support wall and the contact wall.

The heat dissipation paths may be formed and arranged in the horizontal direction in the support wall and the contact wall.

The apparatus may further include a height control mechanism that controls the height of the support portion.

As described above, in the apparatus for charging and discharging according to the embodiments of the present invention, a charging and discharging operation may be performed while limiting the expansion of a secondary battery regardless of the thickness and height of the secondary battery.

Also, the structure of partition walls may be used to compensate for a difference in thickness of each secondary battery, so that the secondary battery may be more precisely aligned.

Also, a metal with high heat transfer coefficient is used as the material of the partition walls, and the partition walls are perforated so that heat generated by the battery may be easily dissipated, so that heat generated from the secondary battery in the charging and discharging operation may be effectively dissipated.

Accordingly, a charging and discharging operation, a high-temperature aging operation, and the like may be performed in a formation process while limiting the expansion of a can of a battery through a simple operation regardless of the differences between each manufacturer and between each model, thereby saving time and cost.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
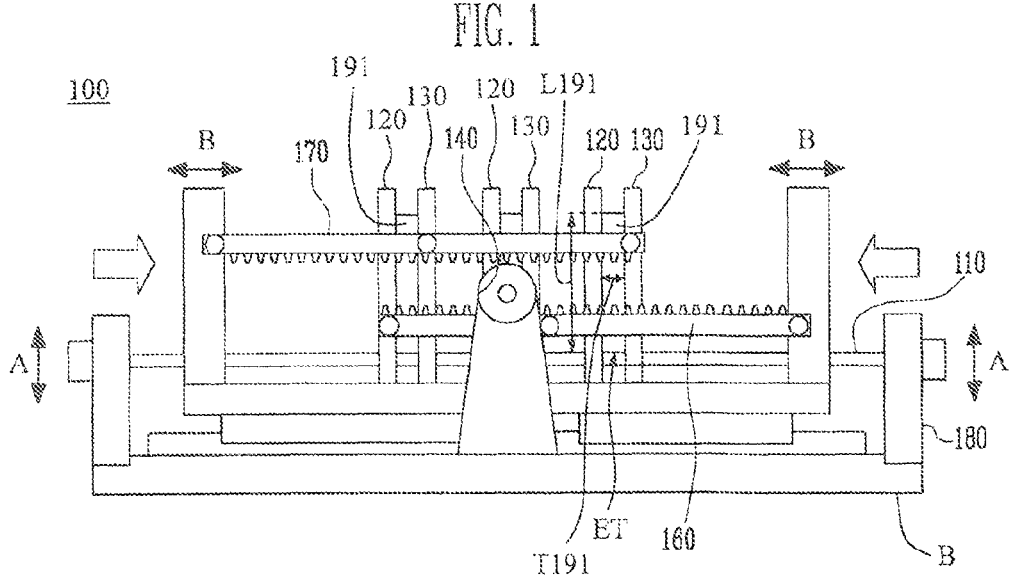
FIG. 1 is a schematic front elevation view of an apparatus for charging and discharging a battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. When terms that indicate directions, such as to top, bottom left and right, are used without special notation, the terms indicate directions represented in the drawings.

First Embodiment

As shown in FIG. 1, the apparatus 100 for charging and discharging a secondary battery according to the embodiment of the present invention includes a support portion 110, first and second racks 160 and 170, first and second vertical partition walls 120 and 130 and a pinion 140. Hereinafter, each of the components will be described in detail. The apparatus 100 for charging and discharging may be used as an adjustable jig for charging and discharging the battery.

In this embodiment, the support portion 110 is formed with two long rods, and these two long rods may be disposed in parallel to each other. In one embodiment, the support portion 110 may extend in a horizontal direction. In a case where a battery is inserted into the apparatus according to this embodiment, the support portion 110 supports the inserted battery. The support portion 110 may be formed in various shapes. For example, the support portion 110 may be formed in a flat plate shape or in a plurality of rod shapes.

A height control mechanism 180 may support the support portion 110 and control the height of the support portion 110 in direction A. When a battery is inserted into the apparatus 100, an electrical terminal ET of a secondary battery 191 is necessarily located at a constant height measured from the bottom B of the apparatus 100 for the purpose of enabling a fast charging and discharging operation. Therefore, although a battery with various lengths L191 is inserted into the apparatus, the inserted battery 191 may be controlled by the height control mechanism 180 so that the electrical terminal of the inserted battery 191 may be located at the constant height. Meanwhile, the height control mechanism 180 may also be implemented in various shapes using various methods. The height control mechanism 180 may be implemented through various mechanical mechanisms such as a manual mechanism, an air pressure mechanism and an oil pressure mechanism. Such various height control mechanisms are well known in the art, and therefore, their detailed descriptions will be omitted. The first and second racks 160 and 170 may move in direction B.

The first and second racks 160 and 170 and the pinion 140 will be described with reference to FIGS. 3A and 3B. The rack and pinion form a kind of gear. In this embodiment, one pinion 140 and two racks 160 and 170 engaged with the pinion 140 are provided. The first rack 160 may be engaged with a lower portion of the pinion 140, and the second rack 170 may be engaged with an upper portion of the pinion 140.

Figure 3A:
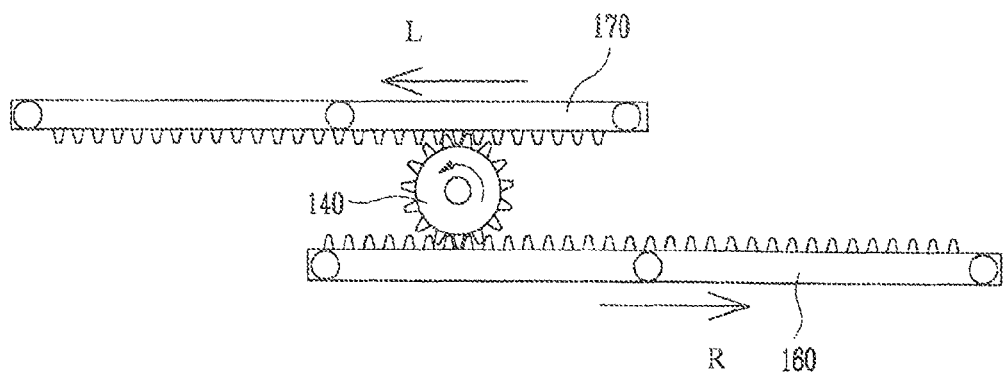
FIG. 3A is a schematic view illustrating the relative movement that occurs in a configuration of racks and a pinion constructed with the embodiment of the present invention.

As shown in FIG. 3A, in a case where the pinion 140 is rotated counterclockwise, the first rack 160 is moved in the right direction R, and the second rack 170 is moved in the left direction L.

Figure 3B:
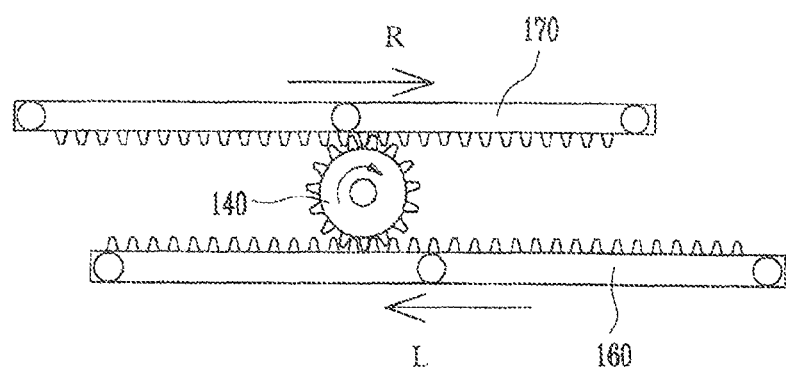
FIG. 3B is a schematic view illustrating a case where the pinion is rotated in the opposite direction in comparison with FIG. 3A.

On the contrary, as shown in FIG. 3B, in a case where the pinion 140 is rotated clockwise, the first rack 160 is moved in the left direction L, and the second rack 170 is moved in the right direction R.

That is, the first and second racks 160 and 170 are moved in the opposite directions with respect to each other in the state that the first and second racks 160 and 170 are disposed in parallel to each other according to the rotation of the pinion 140.

Figure 2:
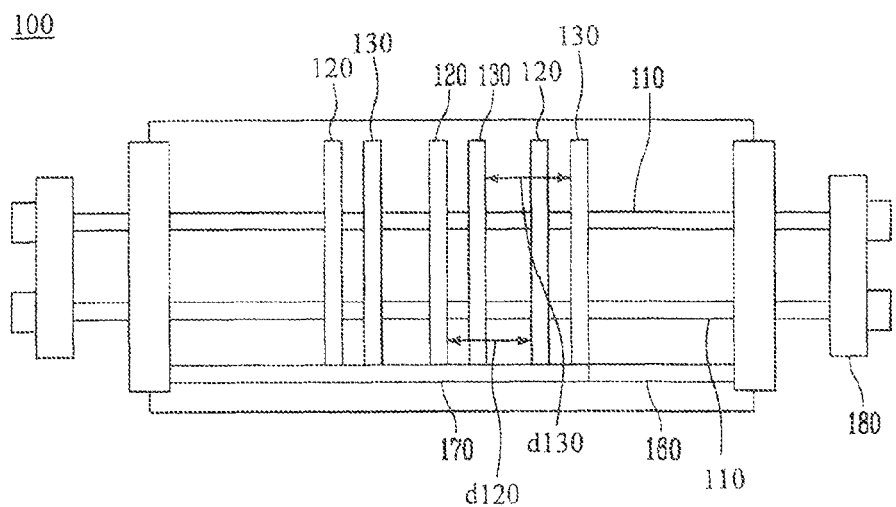
FIG. 2 is a plan view of the apparatus of FIG. 1.

Turning back to FIGS. 1 and 2, the first and second vertical partition walls 120 and 130 are described. The first vertical partition walls 120 may be provided as many as the number of batteries that are to be subjected to charging and discharging at a time. The first vertical partition walls 120 are fixed to the first rack 160 at a constant interval.

The number of the second vertical partition walls 130 may be same as the number of the first vertical partition walls 120. Like the first vertical partition walls 120, the second vertical partition walls 130 are arranged at a constant interval. For example, the first vertical partition walls 120 may be arranged at a constant interval d120, and the first vertical partition walls 130 may be arranged at a constant interval d130. In this instance, the first and second vertical partition walls 120 and 130 may be alternately arranged. In one embodiment, expect for the partition walls disposed at the outermost side, one first vertical partition wall 120 is disposed between two second vertical partition walls 130, and one second vertical partition wall 130 is disposed between two first vertical partition walls 120. In one embodiment, d120 may be identical to d130.

The first and second vertical partition walls 120 and 130 may be formed of a heat transfer metallic material so that heat generated from a secondary battery during charging and discharging may be effectively dissipated to the exterior thereof. That is, the first and second vertical partition walls 120 and 130 may be formed of an alloy including a metal with high heat transfer coefficient, such as aluminum, iron, tungsten or copper.

Meanwhile, in order to control the pinion 140, the apparatus may further include a driving portion (not shown) that generates a rotation force in response to the application electric energy.

In one embodiment, the first vertical partition walls 120 may be attached to one of the first and second racks, and the second vertical partition walls 130 may be attached to the other one of the first and second racks.

In one embodiment, the first vertical partition walls 120 do not move around with respect with one of the first and second racks, and the second vertical partition walls 130 do not move around with respect with the other one of the first and second racks.

If the driving portion (not shown) provides a rotational force to the pinion 140, the pinion 140 will be rotated in a predetermined direction. In a case where the pinion 140 is rotated counterclockwise, the first and second racks 160 and 170 are moved in the directions in which they both become more distant from each other, so that the interval of separation between the first and second vertical partition walls 120 and 130 is widened. Then, a battery is inserted into the interval between one of the first vertical partition walls 120 and one of the second vertical partition walls 130. The depth by which the inserted battery is inserted into the interval is limited by the support portion 110. Meanwhile, the center point of the distance between the neighboring first and second vertical partition walls 120 and 130 is always located at the same position, regardless of the travel by the first and second vertical partition walls 120 and 130. Thus, in a case where the inserted battery is fixed and securely held by controlling the positions of the first and second vertical partition walls 120 and 130 based on the thickness T191 of the inserted battery 191, the terminal of the inserted battery is always located at a constant unvarying position with respect to the apparatus 100. A plurality of vertical partition walls embracing each battery are separated from each other, so that it is possible to easily dissipate heat generated from the battery and to minimize the influence of other neighboring batteries, given by the expansion of the battery in a case where the battery is seriously expanded due to the occurrence of an error in a charging and discharging operation.

Meanwhile, the apparatus may further include a first fixing or locking mechanism (not shown) that fixes the pinion 140. When the positions of the first and second vertical partition walls 120 and 130 need to be fixed (i.e., the first and second vertical partition walls 120 and 130 do not further change positions) or the positions of the first and second vertical partition walls 120 and 130 need to be fixed (i.e., the first and second vertical partition walls 120 and 130 do not further change positions) in the state where a battery is pressurized by the neighboring first and second vertical partition walls 120 and 130, the first fixing mechanism (not shown) fixes or locks the pinion 140 during the charging and discharging operation. The first fixing mechanism (not shown) may be implemented through various brake-type mechanisms. That is, the first fixing mechanism (not shown) may be implemented as a brake using any one of air pressure and oil pressure, or may be implemented as a manual mechanical brake. Detailed description of the kinds of fixing mechanism is omitted.

Second Embodiment

Figure 4A:
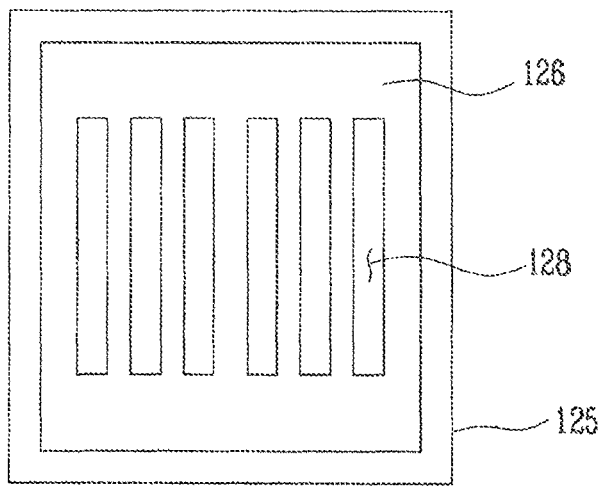
FIG. 4A is a schematic front view of a vertical partition wall constructed with another embodiment of the present invention.
Figure 4B:
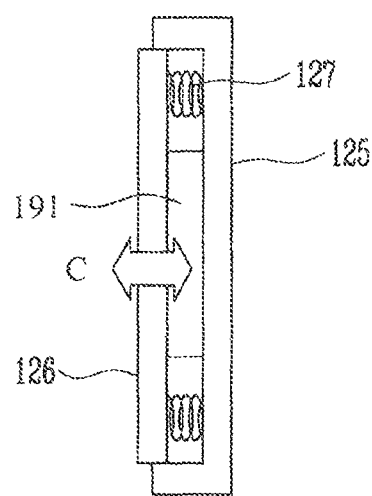
FIG. 4B is a side view of the vertical partition wall of FIG. 4A.

The second embodiment of the present invention relates to another embodiment constructed with a vertical partition wall shown in FIGS. 4A and 4B.

The vertical partition wall incorporated into the second embodiment includes a support wall 125, an elastic member 127 and a contact wall 126. The support wall 125 is a component that fixes or attaches to the first or second rack 160 or 170 (see FIG. 1). The support wall 125 may be formed in a flat plate shape. An edge portion of the support wall 125 is formed to be extended in the direction in which the support wall 125 comes in contact with a battery so that the contact wall 126, which will be described later, may travel in a constant direction. The contact wall 126 is a portion that comes in contact with the battery, and may be formed in a flat plate shape. The elastic member 127 is provided between the contact wall 126 and the support wall 125 so as to support the battery 191 with a constant elastic force when the contact wall 126 comes in contact with the battery. The contact wall 126 may be moved by the elastic member 127 in direction C.

As described above, like the first and second vertical partition walls 120 and 130, the contact wall 126 and the support wall 125 may be formed from a metal with high heat transfer coefficient, such as aluminum, iron, tungsten or copper, or an alloy thereof. Meanwhile, heat dissipation paths 128 may be formed in the support wall 125 and the contact wall 126 in the horizontal direction, i.e., in the direction in which they pass through the support wall 125 and the contact wall 126 so that heat dissipation may be effectively accomplished. In one embodiment, each of the heat dissipation paths 128 may extend in a vertical diction. Because of the high heat transfer coefficient of the material of the support wall 125 and the contact wall 126 and the effect of the heat dissipation paths 128, heat generated from a secondary battery during a formation process, particularly during a charging and discharging process, may be effectively dissipated to the exterior of the apparatus 100. The heat dissipation paths 128 may be through holes.

Third Embodiment

Figure 5:
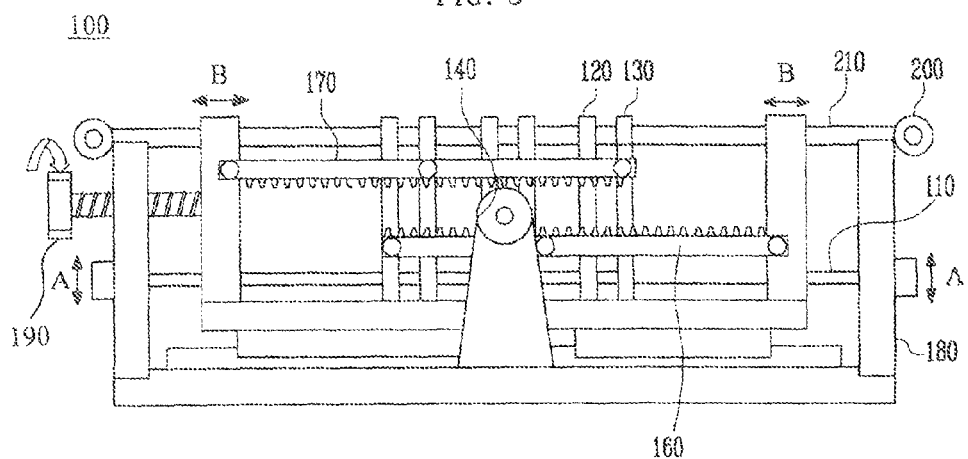
FIG. 5 is a front side view of an apparatus for charging and discharging according to still another embodiment of the present invention.

The third embodiment will be described with reference to FIG. 5. The third embodiment does not include a separate driving portion that drives the pinion 140 and a fixing mechanism. The third embodiment includes an aligning portion 210 and a second fixing mechanism 190.

The aligning portion 210 is a component that moves any one of the first or second vertical partition wall 120 or 130 located at an outermost side in the horizontal direction. As a rotating portion 200 is turned, the aligning portion 210 performs a rectilinear motion to move any one of the first and second vertical partition walls 120 and 130. Accordingly, one of the first and second racks 160, 170 is moved together with the aligning portion 210. In a case where any one of the racks is moved, the pinion 140 is rotated, and the other rack is moved in the opposite direction. That is, as the rotating portion 200 and the aligning portion 210 are operated, it is possible to obtain the same effect as the driving portion (not shown) of the first embodiment provides. In this instance, the aligning portion 210 may be implemented as a ball-screw type aligning portion for the purpose of minute distance adjustment. A ball-screw type alignment portion may perform the alignment mechanism by translating a rotational motion to a linear motion. In this case, a female screw is formed at the first or second vertical partition wall 120 or 130 positioned at the outermost side, so that the first or second vertical partition wall 120 or 130 will be connected to the aligning portion 210. For this reason, the first or second vertical partition wall 120 or 130 connected to the aligning portion 210 may be formed as a separate single partition wall that does not make a pair.

The second fixing mechanism 190 is a component that limits the movement of at least one of the first and second vertical partition walls 120 and 130 respectively positioned at the outermost sides. The second fixing mechanism 190 may be implemented as a ball-screw type fixing mechanism. A ball-screw type fixing mechanism may perform the fixing mechanism by translating a rotational motion to a linear motion. In this case, the second fixing mechanism 190 limits the movement of the first and second vertical partition walls 120 and 130 in the apparatus 100 by using a screw control method. The second fixing mechanism 190 may be provided with two fixing mechanisms positioned at the left and right. In a case where only one fixing mechanism is provided, the same effect may be obtained.

Figure 6:
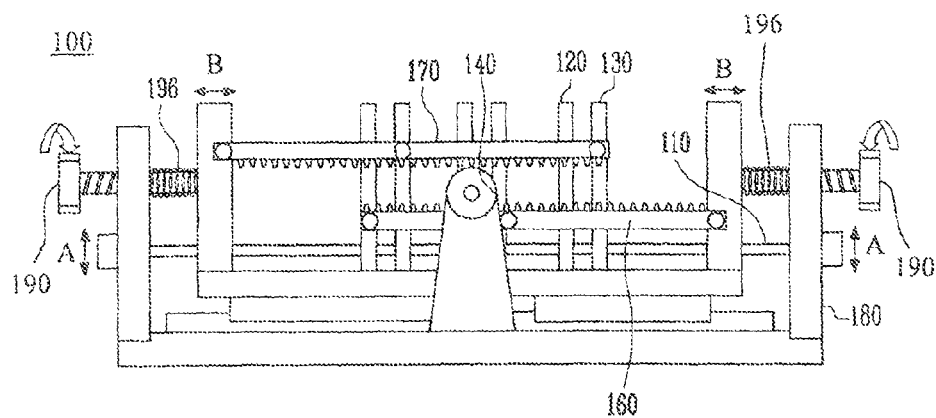
FIG. 6 is a front side view of an apparatus for charging and discharging according to still another embodiment of the present invention.

Meanwhile, an elastic member 196 may be further provided to the second fixing mechanism 190 as shown in FIG. 6. The elastic member 196 pressurizes the first and second vertical partition walls 120 and 130 respectively located at the outermost sides with an elastic force based on the strength at which the second fixing mechanism 190 tightens the first and second vertical partition walls 120 and 130. That is, the second fixing mechanism 190 may limit the movement of the first and second vertical partition walls 120 and 130 respectively positioned at the outermost sides, so that it is possible to limit the expansion of the case of a battery and to control such limiting power with a desired elastic force.

In this embodiment, the aligning portion 210 and the second fixing mechanism 190 are provided, so that it is possible to perform the limitation and alignment of a battery without a separate driving portion or fixing mechanism.

Hereinafter, the operation according to this embodiment will be described with reference to the accompanying drawings.

Before a battery is inserted into the apparatus as an initial state, the first and second vertical partition walls 120 and 130 may be freely moved. In a case where an air pressure brake (air-brake type locking mechanism) is used as the fixing mechanism (not shown), the rotation of the pinion 140 is possible in the state that air is supplied. Subsequently, the height of the support portion 110 is controlled to be a predetermined height based on the height of the battery by using the height control mechanism 180. Subsequently, the battery is inserted into the apparatus and then securely held by controlling the pinion 140. If the fixation of the battery is completed, the supply of the air to the fixing mechanism (not shown) is blocked, and the rotation of the pinion 140 is fixed by an internal disk.

In this instance, a difference in thickness of the battery can be compensated by providing the vertical partition wall described in the second embodiment.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An apparatus for charging and discharging, the apparatus comprising:
   a support portion that supports a secondary battery;
   first and second racks disposed above the support portion, with the first and second racks being adjustable to move in a horizontal direction;
   a plurality of first vertical partition walls attached to the first rack at a first constant interval;
   a plurality of second vertical partition walls attached to the second rack at a second constant interval, and the first and second vertical partition walls being alternately arranged; and
   a pinion driving the first and second vertical partition walls to move in opposite directions with respect to each other.

2. The apparatus according to claim 1, further comprising a driving portion that rotates the pinion.

3. The apparatus according to claim 2, further comprising a first fixing mechanism that locks the pinion against rotation.

4. The apparatus according to claim 3, wherein the first fixing mechanism is a brake fixing mechanism using any one of air pressure and oil pressure.

5. The apparatus according to claim 1, further comprising an aligning portion that moves any one of the first and second vertical partition walls respectively positioned at outermost sides with respect to the other one of the first and second vertical partition walls respectively positioned at outermost sides in the horizontal direction.

6. The apparatus according to claim 5, wherein the aligning portion is a ball-screw type aligning portion adapted to translate a rotational motion into a linear motion.

7. The apparatus according to claim 5, further comprising a second fixing mechanism that limits the movement of at least one of the first and second vertical partition walls respectively positioned at the outermost sides.

8. The apparatus according to claim 7, wherein the second fixing mechanism is a hall-screw type fixing mechanism by translating a rotational motion to a linear motion.

9. The apparatus according to claim 8, wherein the second fixing mechanism is provided with a first elastic member that supports the first and second vertical partition walls respectively positioned at the outermost sides with an elastic force.

10. The apparatus according to claim 1, wherein the first and second, vertical partition walls are formed of a metallic material.

11. The apparatus according to claim 10, wherein the first and second vertical partition walls are formed of an alloy including at least one of aluminum, iron, tungsten and copper.

12. The apparatus according to claim 1, wherein heat dissipation paths are arranged along the horizontal direction in the first and second partition walls.

13. The apparatus according to claim 1, wherein each of the first and second vertical partition walls comprises:
    a support wall fixed to the first and second racks;
    a contact wall that comes in contact with the secondary battery; and
    a second elastic member interposed between the support wall and the contact wall.

14. The apparatus according to claim 13, wherein the heat dissipation paths are arranged in the horizontal direction in the support wall and the contact wall.

15. The apparatus according to claim 1, further comprising a height control mechanism that controls the height of the support portion.

16. An apparatus for charging and discharging a secondary battery, the apparatus comprising:
    a support portion supporting the secondary battery;

first and second racks disposed in parallel to and spaced apart from each other;
a plurality of first vertical partition walls attached to the first rack at a first constant interval, a plurality of second vertical partition walls attached to the second rack at a second constant interval, the first and second vertical partition walls being alternately arranged, and the secondary battery being disposed between one of the first vertical partition walls and one of the second vertical partition walls; and
a pinion driving the first and second racks to move in opposite directions with respect to each other.

17. The apparatus of claim 16, wherein a center point of a distance between one of the first vertical partition walls and one of the second vertical partition walls which is neighboring to the one of the first vertical partition walls is fixed with respect to the apparatus.

18. The apparatus of claim 16, further comprising a first mechanism that limits the movement of at least one of the first and second vertical partition walls respectively positioned at outermost sides in a horizontal direction.

19. The apparatus of claim 16, further comprising a second mechanism that locks the pinion.

20. The apparatus of claim 16, wherein the first constant interval is identical to the second constant interval.

* * * * *